Figures 1, 2:
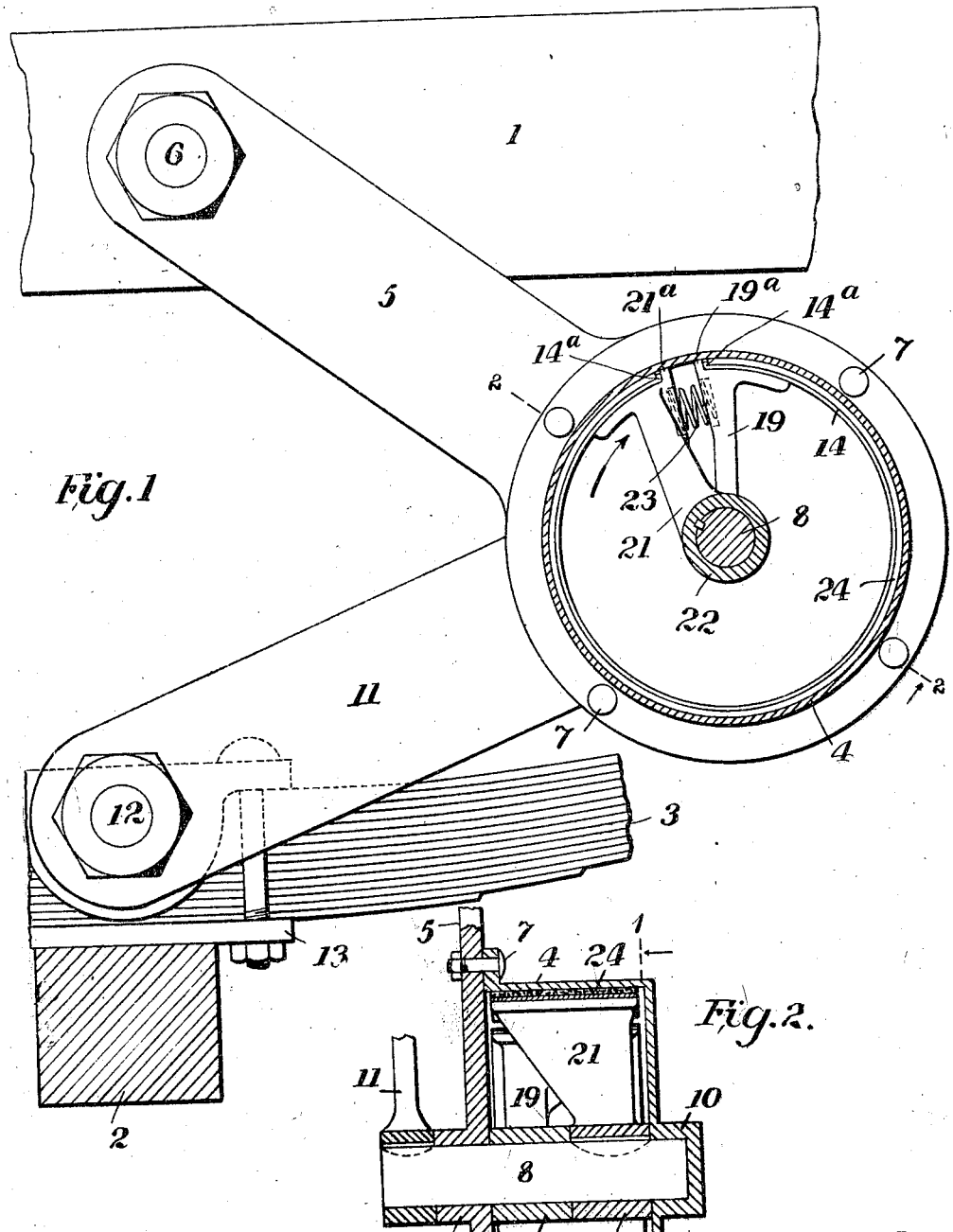

A. LOOMIS.
SHOCK ABSORBER FOR MOTOR VEHICLES.
APPLICATION FILED MAR. 19, 1908.

982,282.

Patented Jan. 24, 1911.
2 SHEETS—SHEET 1.

Witnesses
J. J. McCarthy
C. H. Taylor

Inventor
Allen Loomis
By Foster Freeman
Watson & Coit
Attorneys

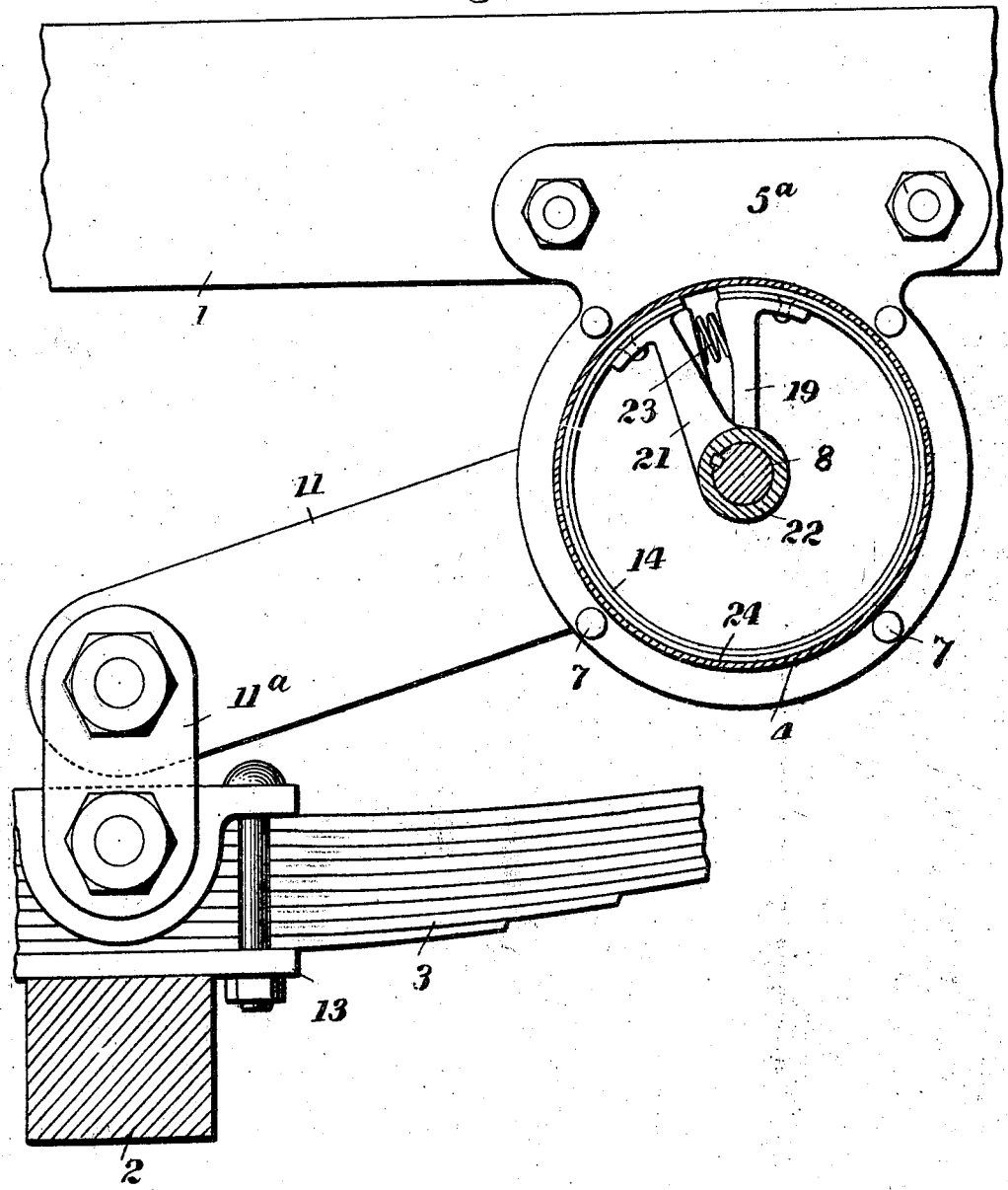

UNITED STATES PATENT OFFICE.

ALLEN LOOMIS, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

SHOCK-ABSORBER FOR MOTOR-VEHICLES.

982,282.

Specification of Letters Patent. Patented Jan. 24, 1911.

Application filed March 19, 1908. Serial No. 422,041.

*To all whom it may concern:*

Be it known that I, ALLEN LOOMIS, a citizen of the United States, and resident of Detroit, Wayne county, State of Michigan, have invented certain new and useful Improvements in Shock-Absorbers for Motor-Vehicles, of which the following is a specification.

The present invention relates to improvements in devices for relieving the shock due to the vibration between the body and axle of a vehicle when moving over rough or uneven surfaces and is particularly adapted for use with motor vehicles.

Various devices have been proposed for effecting the general object of this invention, such devices being of two types or classes. In devices of one character means are provided for checking the vibration of the vehicle body both during the depressions thereof, or the movement which places the vehicle springs under tension, and during the return movement.

The present invention relates however to the other class of shock absorbers, namely, that in which very little additional resistance is offered to the movements tending to carry the axle and body of the vehicle toward each other, but which retard the opposite movement, or that which returns the parts to normal position.

In the accompanying drawings, Figure 1 is an elevation partly in section on the line 1—1 of Fig. 2, of an embodiment of the invention; Fig. 2 is a sectional view on the line 2—2 of Fig. 1; and Fig. 3 is a view similar to Fig. 1 illustrating another form of the invention.

Referring to the drawings, 1 designates a portion of a side bar of a vehicle frame, 2 an axle of the vehicle and 3 a portion of one of the springs which are interposed between the axle and the frame and support the latter.

A drum or casing 4 is rigidly secured to an arm 5 which is pivotally connected with the frame bar 1 by a bolt 6. As shown, the bar 5 is enlarged at its outer end and forms one of the end walls of the drum or casing, the other end wall being shown as formed integral with the peripheral wall of the casing which is secured to the arm 5 by bolts 7. A shaft 8 is journaled in bearings 9, 10, carried by the end walls of the drum or casing 4, said shaft being of such length as to project beyond the bearing 9 and to this projecting end of said shaft is rigidly connected, by a suitable key or spline, one end of an arm 11, the other end of which is pivotally connected with the axle as by means of a bolt 12 engaging a suitable ear or plate carried by the spring clip 13.

Within the drum or casing 4 and extending about the shaft 8 is a split ring 14, one end of which is connected with or supported by the outer end of an arm 19 carried by a sleeve 20 loosely mounted on the shaft 8. The other end of the split ring is connected with or supported by an arm 21 carried by a sleeve 22 rigidly connected with the shaft 8, so as to turn therewith, by a suitable spline or key. The ring 14 is adapted to bear against the inner surface of the peripheral wall of the drum or casing 4 and is normally held in close contact with that wall by a coiled spring 23 arranged between the arms 19, 21, as shown in Fig. 1. If preferred the ring may be faced with a layer of felt 24 or other suitable friction material.

As shown in Fig. 1 the arms 19 and 21 are provided with flanges $19^a$ and $21^a$ at their ends respectively, against which the corresponding ends of the split ring 14 bear. The ends of the split ring are provided with flanges $14^a$ against which the ends of the strip or ring of frictional material 24 abut. When the parts are so constructed, the ends of the split ring 14 need not be attached to the arms 19 and 21, as it is confined in all directions and must retain its proper position in the casing. This construction and arrangement is preferred as it permits of ready replacement of the split ring and the material 24 when they become worn, and these are the only parts which are subject to any material wear.

When the axle and frame piece 1 are caused to approach each other, the arms 11 and 5 will be rocked about their respective pivotal connections with said parts and thereby a slight turning movement imparted both to the drum or casing 4 and the shaft 8. As the arm 21 is rigidly connected with the shaft such movement will act to carry said arm in the direction of the arrow, Fig. 1, toward the arm 19, thereby drawing the split ring 14 from close contact with the drum so that very little resistance is offered by said ring to such relative movement of the frame and axle. As soon, however, as the parts start to return to normal position under the influence of the spring 3, the drum and shaft will be rocked in the opposite direction and under the action of the spring 23 the split ring or friction band will be held in close contact with the drum and thus afford considerable resistance and materially retard the movement.

Referring to Fig. 3, the casing 4 is provided with a rigid arm or bracket 5ª, which is connected with the frame 1 and the arm 11 is connected with the spring or axle by a link 11ᵇ. As shown in this figure, the split ring 14 is secured to the arms 19 and 21 instead of being removably mounted thereon. The operation of the absorber shown in Fig. 3 is substantially the same as the operation of that shown in Figs. 1 and 2.

The working parts of the device being all inclosed within a drum or casing which effectually excludes dust, the device may be easily lubricated and is not liable to have its parts disarranged.

While the embodiments of the invention illustrated are those at present preferred, it will be evident that there may be variation or modification of the details herein shown without departing from the spirit of the invention. For instance, instead of making the spring 23 in the form illustrated, the same results would be obtained if the spring were coiled about the shaft or sleeves thereon and its ends caused to bear against the arms 19, 21. It will also be evident that the arm 5 or the casing 4 may be connected to any convenient part of the frame or body of the vehicle and that the arm 11 may be connected to any part which is movable with the axle relatively to the body.

Having described my invention what I claim and desire to secure by Letters Patent is, 1. In an apparatus for cushioning the relative movements of a vehicle axle and body, the combination of a friction surface connected with one of the relatively movable parts, a shaft connected with the other of said movable parts and arranged concentric with said friction surface, and a split ring arranged to contact with the friction surface and having one end connected with a part rigid on the shaft, and a part movably mounted on the shaft to which the other end of said split ring is connected, for the purpose described.

2. In an apparatus for cushioning the relative movements of a vehicle axle and body, the combination of a cylindrical casing, a shaft concentric with the casing, a pair of arms extending radially from said shaft toward the casing, one of said arms being connected with the shaft and the other free thereon, and a split ring removably connected with said arms and arranged within the casing, for the purpose described.

3. In an apparatus for cushioning the relative movements of a vehicle axle and body, the combination of a cylindrical casing, a shaft concentric with the casing, a pair of arms extending radially from said shaft toward the casing, one of said arms being connected with the shaft and the other free thereon, and a split ring removably connected with said arms, and arranged within the casing, said arms having flanges at their ends against which the ends of said split ring abut, for the purpose described.

4. In an apparatus for cushioning the relative movements of a vehicle axle and body, the combination of a cylindrical casing, a shaft concentric with the casing, a pair of arms extending radially from said shaft toward the casing, one of said arms being connected with the shaft and the other free thereon, and a split ring removably connected with said arms and arranged within the casing, said split ring being provided with a facing of frictional material and having flanges at its ends against which the ends of said frictional material abut, for the purpose described.

5. In an apparatus for cushioning the relative movements of a vehicle axle and body, the combination with the body, of a cylindrical casing connected with the body, a shaft concentric with said casing and having an arm connected with the axle, a pair of arms within the casing, one of which is freely mounted on the shaft and the other rigidly connected with the shaft, a split ring having its ends supported on said arms and a spring tending to move said arms apart, for the purpose described.

6. In an apparatus for cushioning the relative movements of a vehicle axle and body frame, the combination of two arms pivotally connected respectively with the axle and body frame, a shaft rigidly connected with one of said arms, a friction surface carried by the other arm and extending concentric with the shaft, and a split ring adapted to contact with the friction surface and having one end connected rigidly with the shaft and its other end connected with a member supported by but free to turn on the shaft, for the purpose described.

7. In an apparatus for cushioning the relative movements of a vehicle axle and body frame, the combination of two arms pivotally connected respectively with the axle and body frame, a shaft rigidly connected with one of said arms, a friction surface carried by the other arm and extending concentric with the shaft, a split ring adapted to contact with the friction surface and having one of its ends rigidly connected with the shaft and its other end supported by means free to turn on the shaft, and a spring acting to separate the ends of the ring, for the purpose described.

8. In an apparatus for cushioning the relative movements of a vehicle axle and body frame, the combination of a drum or casing pivotally supported on one of said members, a shaft journaled in bearings in the casing, an arm rigidly connected at one end with the shaft and having its other end pivotally connected with the other member of the vehicle, and a split ring arranged within the casing and adapted to contact with a wall thereof, one end of the ring being connected with an arm loosely mounted on the shaft and the other end of the ring being connected with an arm adapted to turn with the shaft, for the purpose described.

9. In an apparatus for cushioning the relative movements of a vehicle axle and body frame, the combination of two arms pivotally connected respectively with the axle and vehicle body, a drum or casing carried by one of said arms, a shaft journaled in bearings in the end walls of the casing and connected with the other of said arms to be rocked as the arm turns on its pivot, an arm loosely mounted on the shaft within the casing, a second arm within the casing and secured to the shaft to turn therewith, and a split ring having its ends connected to said arms within the casing and adapted to contact with the peripheral wall of the casing, substantially as and for the purpose described.

10. In an apparatus for cushioning the relative movements of a vehicle axle and body frame, the combination of two arms pivotally connected respectively with the axle and vehicle body, a drum or casing carried by one of said arms, a shaft journaled in bearings in the end walls of the casing and connected with the other of said arms to be rocked as the arm turns on its pivot, an arm loosely mounted on the shaft within the casing, a second arm within the casing, and secured to the shaft to turn therewith, a split ring adapted to contact with a wall of the drum or casing and having its ends connected with said arms within the casing, and a spring acting to separate the ends of the ring, substantially as and for the purpose described.

11. The combination with two parts adapted to move toward and from each other, of means for retarding such movement in one direction comprising a drum like casing pivotally supported by one of the members, a shaft journaled in bearings carried by the casing, an arm rigidly connected to the shaft and pivotally connected with the other member, a split ring surrounding the shaft and bearing against the peripheral wall of the casing, and two arms each connected with an end of the ring, one of said arms being loosely supported on the shaft and the other being connected with the shaft to turn therewith, whereby as the shaft and drum move relatively in one direction the arms within the casing will be relatively adjusted and the split ring moved from the casing and when the relative movement of the shaft and drum is reversed the ring will closely engage the drum.

12. In an apparatus for cushioning the relative movement of a vehicle axle and body, the combination with two jointed members secured to the vehicle axle and body respectively, one of the members being provided with a cylindrical friction surface, a friction ring coöperating therewith, an arm on one of said jointed members bearing against one end of the ring and a freely movable arm bearing against the opposite end of the ring, and a spring constructed to throw the ring into engagement with the coöperating friction surface.

13. In an apparatus for cushioning the relative movement of a vehicle axle and body, the combination with two members connected by a pivot pin and secured to the vehicle axle and body respectively, a friction drum secured to one of the members, a split friction ring coöperating therewith, one end of the ring being secured to one of the jointed members, and an arm pivotally mounted on the pivot pin and engaging the other end of the ring.

14. In an apparatus for cushioning the relative movement of a vehicle axle and body, the combination with two members connected by a pivot pin rigidly secured to one of the members, said members being secured to the vehicle axle and body respectively, a friction drum secured to one of the members, a split friction ring coöperating therewith, an arm rigidly secured to the pivot pin and engaging one end of the split ring, and an arm pivotally mounted on the pivot pin and engaging the other end of the ring.

In testimony whereof I affix my signature in presence of two witnesses.

ALLEN LOOMIS.

Witnesses:
CLARA I. DALE,
RAYMOND KAIN.